Patented May 9, 1944

2,348,647

UNITED STATES PATENT OFFICE 2,348,647

CATALYTIC PROCESS

Edward D. Reeves, Cranford, and Kenneth K. Kearby, Elizabeth, N. J., assignors to Standard Oil Development Company, a corporation of Delaware No Drawing. Original application December 30, 1939, Serial No. 311,936. Divided and this application July 16, 1942, Serial No. 451,220

8 Claims. (Cl. 196—52)

This invention relates to an improved catalyst adapted for the treatment of hydrocarbons, and particularly for the catalytic conversion of hydrocarbon oils. It pertains more particularly to absorptive catalysts composed of silica and alumina of high catalytic activity and stability and good regenerative properties.

While the catalysts so produced will have a more general application in the broader phases of this invention, such as in other types of hydrocarbon reactions including purifying and refining, they have been found to be particularly suitable for use in catalytic cracking.

It has previously been proposed to use various mixtures of silica and alumina and gels thereof as cracking catalysts. One type of such catalysts is prepared by impregnation of silica gel with soluble salts, such as salts of aluminum, which are then converted to the oxides. The silica in these catalysts has been present in large unit micelles of high molecular weight. The added alumina can form a complex alumino silicate only on points of unsaturation on these micelles, probably mostly at the ends of silica chains. The resulting catalyst thus consists of very large units of inert silica with the active alumino silicate distributed at random points on the unit micelles. In contrast to this, in the formation of the improved catalysts of this invention, the chance of an alumina molecule combining with each silica molecule as it forms is almost equal to the probability of two silica molecules polymerizing. Consequently, the preferred catalyst of this invention consists almost entirely of active alumino silicate with very little polymerized silica.

Also the usual methods of preparing silica-alumina synthetic catalysts involve the use of sodium silicate as a source of the silica. When such alkali silicates are brought into contact with hydrated alumina, complex zeolites result. Similar zeolites are found in catalysts prepared as plural gels or co-precipitates, as these are contaminated by the alkali silicates used in their preparation. Many of the naturally occurring clays also contain such zeolitic compounds. The alkali is removed from these zeolites as much as practically possible, by acid leaching or other suitable means, for the reason that alkali, and particularly sodium salts, are highly objectionable in aluminum silicate catalysts used for the cracking or other thermal treatment of hydrocarbon oils. However, the last traces of alkali cannot be removed (by practicable methods) from such zeolites either naturally occurring or synthetically prepared, and it has been found that the use of silicon compounds free of alkali metals in the preparation of alumino silicate catalysts yields catalyst of greatly increased activity.

It has also previously been known that hydrocarbon oil cracked in the presence of certain solid absorbent contact materials such as naturally active or activated clays results in the formation of high yields of motor fuel having high anti-knock properties. During the cracking operation the contact mass becomes fouled more or less rapidly with carbonaceous deposits requiring periodic discontinuance of the cracking treatment to remove some of the deposits. This removal is accomplished by passing an oxidizing gas through the mass and burning off the carbon. Such treatment results in the evolution of large amounts of heat.

One objection to the use of absorptive clays for catalytic cracking is that when exposed to high temperatures in excess of 1000° F., for example, such materials rapidly lose their catalytic activity. In view of this it is necessary to provide means for rapidly removing heat liberated during regeneration to avoid permanent impairment of the efficiency of the catalyst. One method of control of regenerating temperature is to dilute the oxidizing gas with an inert gas to reduce the reaction rate and increase the capacity of the gases to remove heat of reaction. This necessarily slows down the regeneration and increases the length of time the catalyst and reaction chamber are out of operation, thus requiring more reaction chambers to produce a given yield of gasoline.

The presence of alkali in mixed alumina silicate catalysts of the zeolitic type also reduces the melting or fusion point of such catalysts, thus causing them to become inactivated at relatively low regeneration temperatures. Hence the catalysts of the present invention, being free of alkali zeolites, are more readily regenerated at high temperatures without loss in activity. These improved catalysts are thus advantageous for use generally in all hydrocarbon treatments in which the catalyst requires periodic regeneration at elevated temperatures.

It is an object of the present invention to provide improved alumina-silica catalysts, free of alkali, having high catalytic activity and good regenerative properties, for the treatment of hydrocarbons, particularly for hydrocarbon conversions conducted at elevated temperatures.

It is a further object of the present invention to provide an improved absorptive cracking catalyst having a higher cracking efficiency and which will maintain its efficiency over extended periods despite frequent regenerations by oxidation.

Other and more specific objects and advantages of this invention will be apparent from the following description.

Having outlined the general nature and the objects, this invention will be better understood from a more detailed description of a preferred embodiment, it being understood that the invention is not limited to the specific details given.

In accordance with the present invention, synthetic alumino silicate catalysts are prepared by the use of compounds of aluminum and silicon which are free of alkali metals. It is also desirable to bring the alumina and silica into contact under such conditions that each is present substantially entirely in particles of extremely minute size, such as sols, and in which both the alumina and silica are preferably of molecular dimensions, such as obtained by simultaneous precipitation from a mixed solution.

Suitable methods for preparing such catalysts are illustrated in the following examples:

Example I

A solution of 1648 grams aluminum chloride hexa-hydrate in 1600 cc. of distilled water was added to 4800 cc. of isopropyl alcohol and cooled to 25° C. On addition of 2096 cc. of ethyl ortho silicate the temperature rose to 35° C. The solution was then cooled to 8° C. and 1600 cc. of liquid ethylene oxide were added while stirring. The solution set to a firm gel in about five minutes. After standing overnight, the gel was broken up and dried at room temperature for two days, then at 80–100° C., and was finally heated to 850° F.

Example II

A solution of 1690 g. aluminum chloride hexa-hydrate in 1650 cc. of distilled water was added to 2480 cc. of isopropyl alcohol. On addition of 995 cc. of ethyl ortho silicate the temperature rose to 35° C. A cold solution of 2560 g. aluminum chloride hexa-hydrate in 2480 cc. of distilled water was then added and the total solution cooled to −5° C. While stirring vigorously, 2680 cc. of ethylene oxide were added and the solution allowed to set overnight. The resulting gel was broken up and dried as above.

Example III

A solution of 434 g. of aluminum chloride hexa-hydrate in 725 cc. of distilled water was added to 12 liters of isopropy alcohol. On addition of 8540 cc. of ethyl silicate the temperature rose from 15° to 27° C., and then to 40° C. on the addition of 3490 cc. of water and 1895 cc. of aniline. After setting overnight the gel was broken up and washed with isopropyl alcohol containing a trace of ammonia. The product was dried as above.

The analysis of the catalysts prepared as described in Examples I to III is given in the following table:

| | Catalyst from example No. | | |
|---|---|---|---|
| | I | II | III |
| Constituent percent: | | | |
| $SiO_2$ | 62.7 | 96 | 22.4 |
| $Al_2O_3$ | 37.2 | 3.84 | 75.4 |
| $Fe_2O_3$ | 0.05 | Trace | 0.13 |
| $Na_2O$ | 0.04 | 0.01 | 0.05 |
| $SiO_2/Al_2O_3$ wt. ratio = | 1.7 | 25 | 0.3 |

The formation of alkali-free alumino silicate gels may also be carried out with various modifications of the processes described in the above examples. For example, other alkyl silicates, such as propyl or butyl tetra ortho silicates may be used instead of ethyl ortho silicate. Also, silicon halides and oxy halides such as silicon tetra-chloride, silicon tetra-bromide, silicon oxy chloride and the like, and soluble quaternary ammonium silicates such as tetra methyl ammonium silicate are useful in preparing alkali-free aluminum silicates. The readily hydrolyzable salts such as the halides are preferably hydrolyzed with water or dilute ammonia. This can also be done in the presence of aluminum salts with precipitation of aluminum hydroxide. The quaternary ammonium silicate may also be co-precipitated by reaction with aluminum salts, such as aluminum chloride.

Other compounds than aluminum chloride hexa-hydrate may also be used as a source of the alumina in the processes described above, such as aluminum nitrate, aluminum sulfate, aluminum oxalate and the like, also alkyl aluminates or aluminum alkyl oxides such as aluminum ethoxide, propoxide etc., quaternary ammonium aluminates, and also colloidal alumina sols. For example, a cheap and suitable form of alumina sol may be prepared from aluminum amalgam and water. Anhydrous aluminum halides may also be used, usually by hydrolysis to hydrated alumina. Plural gels and aerogels may be prepared with the use of many of the above reagents and are highly active catalysts.

Example IV

A plural aerogel having the composition 62.2% silica and 37.8% alumina was prepared by allowing a homogeneous solution of ethyl silicate, ethyl alcohol, water, aluminum chloride, ethylene oxide, and a trace of sulfuric acid to set to a gel. This was extracted with ethyl alcohol, and then heated under pressure to 250° C., at which temperature the alcohol was released as a gas. The resulting aerogel had an activity of two to three times greater than a similar mixture prepared from water glass and aluminum nitrate.

Any suitable mutual solvents other than ethyl and isopropyl alcohol may also be used in the preparations described in the above examples, such as methanol, acetone, dioxane, etc.

Other neutralizing agents such as aniline may also be used in place of the ethylene oxide. These are preferred when it is desired to secure a gel structure, but stronger alkaline-acting agents such as ammonia, ammonium carbonate, etc., may also be used to form an alkali-free precipitate of silica and alumina. These mixed or co-precipitates are usually washed free of ammonium salts, dried, and broken to suitable size. The preparation of such catalysts is illustrated in the following example:

Example V 41.2 g. of aluminum chloride hexa-hydrate were dissolved in 40 cc. of water and 120 cc. of isopropyl alcohol and 52.4 cc. of ethyl ortho silicate were added to the solution. This solution was allowed to stand for 20 minutes at 50° C., and was then poured into a solution of 100 cc. of concentrated ammonium hydroxide in 500 cc. of water. The co-precipitate was filtered, washed, dried, and broken to suitable size for use.

Active alkali-free alumino silicate catalysts may also be prepared by coagulating a dialyzed silica sol with the addition of a suitable aluminum compound such as those described above. This preparation is illustrated in the following example:

Example VI

A colloid sol is prepared by adding an aqueous solution of sodium silicate to a solution of dilute hydrochloric acid of such concentration that the resulting solution contains just enough excess acid to give the colloidal silica optimum peptization, i. e., a sol requiring maximum time to coagulate to a gel. It is of advantage at this stage to use stabilizing agents to hinder the polymerization of the silica particles.

For this purpose the protective colloid type of stabilizer is preferred such as glue, gum arabic and the like but other agents such as glycerine, dextrine and the like are also effective. The use of a weaker acid, for example, acetic acid, also permits the preparation of a more stable sol. The colloidal silica sol is immediately subjected to rapid dialysis or electrodialysis to remove the sodium salts, preferably with countercurrent flow of colloidal solution and of pure water on opposite sides of a diffusion membrane. The resulting colloidal solution containing relatively small silica aggregates and substantially free of sodium is mixed with a suitable aluminum compound or a colloidal solution of alumina. The two sols thus are thoroughly mixed and they are then mutually coagulated into a plural gel by addition of dilute ammonia or other suitable electrolyte.

A suspension of aluminum hydroxide may also be added to the silica sol and the alumina then mutually precipitated with the silica sol. The form of alumina added is preferably one which does not coagulate the silica sol so rapidly as to interfere with thorough mixing. Also, soluble aluminum salts or solutions thereof such as aluminum chloride, aluminum nitrate, aluminum acetate, aluminum sulfate and the like may be added to the silica sol, preferably with addition of ammonia to neutralize the acidic ion of the salt. After coagulation the gel or precipitate is freed of excess liquid, dried and heated to about 850° F. The resulting product is a cracking catalyst of high activity and stability.

Other mineral acids such as sulfuric acid may be used in place of the hydrochloric acid in the above example. The hydrochloric acid is, however, prefered as the resulting sodium chloride is much more easily removed by dialysis than is sodium sulfate.

Although the positively charged silica sol prepared in the above example is preferred, a negative sol, that is, one peptized on the alkaline side, is also quite suitable if the sodium is removed sufficiently during the dialysis.

The catalyst prepared by the above-described methods may be used in any number of desirable ways in the treatment or conversion of hydrocarbons. These catalysts may be manufactured in the form of finely divided powders which may be suspended in the materials being treated or placed on trays in the reaction zone, or in the form of pills, pellets or other coarse particles which may be placed on trays or in baskets or packed in the reaction zone and which may be formed by extrusion, pressing or any other suitable method. An essential feature of the use of these catalysts in treating hydrocarbons to insure desirable yields is to provide as intimate contact as possible between the catalyst mass and the reactants.

These catalysts, with or without addition of promoters for specific reactions, have general application in the treatment of hydrocarbons, such as for purifying and refining of oils and also for promoting processes involving conversion and/or cracking of hydrocarbons at elevated temperatures. For example, these catalysts, preferably with the addition of suitable promoters, may be used for such reactions as (1) cracking gas oil, wax, etc., to high octane gasoline, (2) cracking tri-isobutylene to isobutylene, (3) cracking low molecular weight hydrocarbons to gases, (4) liquid phase cracking of oils to gasolines, (5) isomerization and reforming of low octane gasolines without addition of hydrogen, (6) isomerization and reforming of low octane gasolines with addition of hydrogen (hydroforming) and with or without net consumption of hydrogen, (7) dehydrogenation of hydrocarbons, particularly of gaseous and light liquid hydrocarbons and waxes, (8) desulfurization and dechlorination of oils and gasolines, (9) polymerization of olefins to gasolines and oils, (10) polymerization of isobutylene and di-isobutylene to tri- and tetra-isomers, (11) alkylation of aromatic hydrocarbons, (12) alkylation of olefins with paraffins, (13) methanation of organic compounds, particularly of hydrocarbons, and (14) contact treatment of lubricating oils. Any reduction in activity of the catalysts in these processes by the deposition thereon of high molecular weight polymerization or condensation products or other carbonaceous materials or combustible impurities may be offset by a periodic regeneration of the catalysts by treatment with oxidizing gases, preferably under controlled conditions to avoid heating of the catalysts to extremely high temperatures. It is an important advantage of these catalysts that they are capable of repeated regeneration by such oxidation treatments without material loss in activity.

The method of catalyst preparation described in Example VI is readily adapted to the addition of promoters, such as small amounts of the oxides of calcium and magnesium, to the catalyst. These oxides and other suitable promoters may be added with the alumina in the form of soluble salts or suspended hydroxides.

Suitable catalyst promoters may also be added to any of the catalysts described above, including those of Examples I to III, for the purpose of increasing the effectiveness of the catalyst in any desired thermal treatment of hydrocarbons. For example, the effectiveness of these catalysts for catalytic cracking of hydrocarbon oils to produce increased yields of anti-knocking motor fuels may be increased by addition thereto of small amounts of oxides of metals of group II, particularly calcium oxide and magnesium oxide. Other promoters may also be added if it is desired to increase the effectiveness of the catalyst in causing other reactions to occur simultaneously with a cracking operation. For example, if simultaneous cracking and dehydrogenation of hydrocarbons is desired, dehydrogenation catalysts such as chromic oxide, copper and the like may be added to the catalyst described herein. Other reactions such as polymerization, hydrogenation, alkylation, and the like may also be caused to proceed simultaneously with the thermal treatment by addition of suitable promoters specific to such reactions. For example, phosphates and fluorides may be added for polymerization and alkylation catalysts, molybdenum or nickel for hydrogenation, etc.

The catalysts described herein are especially suited for use in the catalytic cracking of hydrocarbon oils to produce high knock rating gasolines. Such cracking operations are preferably conducted at elevated temperatures between about 700° and 1100° F., and at about atmospheric or low superatmospheric pressures with the hydrocarbons substantially completely in the vapor phase. The catalyst is periodically regenerated by treatment with oxidizing gases at a temperature not exceeding about 1400° F., and preferably below 1100° F. The following examples illustrate the activity of the improved catalysts described herein when used in the cracking of petroleum gas oil to produce high quality antiknocking gasoline.

Example VII

A West Texas gas oil was passed in vapor phase at a temperature of 860° F. through a bed of the catalyst described in Example I at a rate of 1.2 volumes of liquid oil per volume of catalyst-filled reaction space per hour. The cracking operation was interrupted periodically and the catalyst regenerated with a mixture of air and nitrogen, as noted, at a temperature between 850° F. and 1100° F., the cracking periods being each of one hour duration and the regenerating periods being two hours. The results are given in the following table:

|  | Air-nitrogen regeneration, cycles | | |
| --- | --- | --- | --- |
|  | 1-4 | 9-12 | 29-32 |
| Volume percent 10 lb. (R. V. P.) gasoline | 39.4 | 38.5 | 38.9 |
| Weight percent coke | 1.7 | 1.7 | 1.9 |
| Weight percent dry gas | 5.4 | 3.9 | 4.8 |
| Volume percent excess butane | 9.9 | 8.2 | 8.6 |
| Octane number—C. F. R. | 78.0 | 79.5 | 79.0 |

Example VIII

The same cracking and regeneration operations described in Example VII were conducted with the catalyst described in Example III with the following results:

|  | Cycles | | | |
| --- | --- | --- | --- | --- |
|  | 1-8 | 17-25 | 33-40 | 49-56 |
| Volume percent 10 lb. (R. V. P.) gasoline | 30.1 | 30.1 | 29.0 | 28.6 |
| Weight percent coke | 0.7 | 0.5 | 1.3 | 1.1 |
| Weight percent dry gas | 4.7 | 5.2 | 3.1 | 3.8 |
| Volume percent excess butane | 7.6 | 5.0 | 4.9 | 3.5 |
| Octane number—C. F. R. | 78.7 | 77.5 | 79.0 | 79.0 |

Example IX

A catalyst was prepared as described in Example I except that calcium chloride was dissolved in the aluminum chloride solution, resulting in a catalyst consisting substantially of pure alumino silicate containing 3% by weight of calcium oxide. This catalyst was used in the same cracking operation described in Example VII, also using air-nitrogen regeneration, and the yield of 10 lb. Reid vapor pressure gasoline was increased 8% above that obtained in operation under the same conditions with the alumino silicate catalyst of Example I.

Two portions of this same calcium oxide promoted catalyst, after heating for 48 hours at 850° and 1400° F., when cracking a petroleum gas oil at 0.6 vol. per vol. of catalyst per hour for two-hour cracking periods at 850° F., using air-nitrogen regenerating mixtures between cracking periods, gave a yield of liquid distillate boiling up to 400° F. (Engler distillation) 1.06 and 1.05 times, respectively, as great as obtained from the same alumino silicate catalyst without addition of calcium oxide used under the same cracking conditions.

Calcium oxide may be added to such catalysts in amounts between about 1% and 10% by weight; a higher calcium oxide content reduces the activity of the catalyst.

Example X

A catalyst was prepared as described in Example I except that magnesium chloride was dissolved in the aluminum chloride solution, resulting in a catalyst consisting substantially of pure alumino silicate containing 3% by weight of magnesium oxide. This catalyst was used in the same cracking operation described in Example VII, using air-nitrogen regeneration, and the yield of 10 lb. Reid vapor pressure gasoline was increased 13% above that obtained in operation under the same conditions with the alumino silicate catalyst of Example I.

Two portions of this same magnesium oxide promoted catalyst, after heating for 48 hours at 850° F. and 1400° F. in nitrogen for 48 hours, when used in cracking a petroleum gas oil at 0.6 vol. per vol. of catalyst per hour for two-hour cracking periods at 850° F. using air-nitrogen regeneration between cracking periods, gave a liquid distillate boiling up to 400° F. (Engler distillation) 1.04 times as great as that obtained when cracking under the same conditions with this same alumino silicate catalyst without addition of magnesium oxide.

Magnesium oxide is preferably added to the catalysts described herein in amounts between about 1% and 15% by weight.

The catalysts described herein are also suitable for the alkylation of olefins with paraffinic hydrocarbons to produce saturated hydrocarbons, particularly when such reactions are conducted under pressures substantially above atmospheric and of the order of 1000 to 3000 lbs. per square inch, or higher. Single paraffinic and olefinic hydrocarbons may be employed as well as mixtures containing these reactants, such as suitable fractions preferably containing saturated and unsaturated hydrocarbons of 4 or 5 carbon atoms per molecule, separated from the products of cracking, catalytic or non-catalytic, of hydrocarbon oils. It is an essential requirement in such alkylation processes that the feed stock contain at least one paraffin containing a tertiary carbon atom and preferably boiling below the boiling point of the desired final fraction and that the feed stock also contain at least one mono-olefin. Partially dehydrogenated field butanes, refinery $C_3$–$C_5$ and $C_4$ cuts, saturated paraffinic mixtures containing isobutane and/or higher tertiary paraffins and which have been enriched with mono-olefins from extraneous sources are also suitable. It is preferable, to insure high yields of alkylation products, to have between about 2 and about 12 mols of the tertiary paraffin in the reactor per mol of mono-olefin present. This avoids excessive formation of high boiling compounds. The reaction may be conducted over a very wide range of temperatures between about 10° and about 500° F., for example, although temperatures outside these ranges may be used with less desirable results. The reaction is generally characterized in requiring a substantially longer time of reaction than is used in corresponding polymerization reactions involving only the olefins present in the feed.

The use of the hereindescribed catalysts in such an alkylation process is illustrated in the following example:

Example XI

A catalyst prepared as described in Example I is packed in the form of small lumps or tablets in a heated reaction vessel and a gaseous mixture containing 75% by weight of isobutane, 2.4% of isobutene, 5.3% of normal butene, and the remainder of propane and normal butane is passed downwardly over the catalyst therein at a rate of 0.7 volume of the gas per volume of catalyst per hour and at a temperature of 417° F., and a pressure of 1800 lbs. per square inch gauge. The process is continued until the catalyst has been used to treat at least four times its own weight of feed, the products issuing from the reactor being cooled and separated into a $C_3$–$C_4$ fraction, a $C_5$–$C_8$ fraction, and a fraction containing hydrocarbons of higher boiling range. There is thus obtained a yield of hydrocarbons of 5 or more carbon atoms per molecule of about 86% by weight on the olefins treated and about 183% by weight on the olefins reacted. These products consist of about 80% by volume of the $C_5$–$C_8$ fraction and about 20% by volume of the $C_{9+}$ fraction, and contain about 63% by weight of saturated hydrocarbons, the $C_5$–$C_8$ fraction having an octane number of about 90. The total products boiling below the $C_5$ range may be recycled or a $C_3$–$C_4$ cut or a $C_4$ cut may be separated therefrom and recycled to the reaction zone with suitable makeup to maintain the desired ratio of isobutane to mono-olefins in the total feed to the reaction chamber. After operation for some time, the catalyst will undergo a decrease in activity due to the accumulation of high molecular weight polymers thereon. The process is then interrupted and the catalyst reactivated by removing these polymers. This may be done by subjecting the catalyst to treatment with an oxidizing gas such as a mixture of air and nitrogen at a temperature of about 850° to 1000° F., the treatment being continued until the catalyst is substantially free of combustible carbonaceous material and the treatment being preferably controlled to avoid heating the catalyst at any time to a temperature above about 1100° F. The regenerated catalyst may then be used again in the alkylation process.

The air-nitrogen mixtures described above as used for catalyst regeneration may vary widely in oxygen content from one or two per cent of oxygen up to undiluted air, the oxygen content being controlled in regard to the amount of combustible materials on the catalyst so as to avoid overheating. Other oxidizing gases may also be used, such as flue gas, mixtures of air and flue gas, mixtures of air and steam, and the like, but the use of air-nitrogen mixtures is preferred as it has been found that this regeneration gas gives a catalyst of high and substantially constant activity even after numerous regeneration cycles, while regenerating gases containing substantial amounts of steam cause a reduction in the activity of the catalyst of this invention.

This application forms a division of application Serial No. 311,936, filed December 30, 1939, now Patent No. 2,317,803, dated April 27, 1943.

While the preferred embodiments of this invention have been described in specific examples presented for purpose of illustration, it will be understood that this invention embraces such other modifications and variations as come within the scope of the accompanying claims.

What is desired to be protected by Letters Patent is:

1. A method of cracking hydrocarbon oils which comprises passing the oil to be cracked through a cracking zone maintained at active cracking temperature, contacting said oil within said cracking zone with an active cracking catalyst free of alkali and comprising alumina, silica and an alkaline earth metal oxide formed by combining the alumina and said alkaline earth metal oxide with silica formed from an alkyl silicate, and maintaining said oil within said cracking zone for a period sufficient to obtain a substantial cracking thereof.

2. The method defined in claim 1 wherein the alkaline earth metal oxide is magnesium oxide.

3. The method defined in claim 1 wherein the alkaline earth metal oxide is calcium oxide.

4. A method of cracking hydrocarbon oils which comprises passing the oil to be cracked through a cracking zone maintained at active cracking temperature, contacting said oil within said cracking zone with a catalyst prepared by mixing a solution containing an alkyl silicate with an aqueous solution of an aluminum salt and an alkaline earth metal salt, adding an organic neutralizing agent to said solution to form a mixed precipitate of alumina, silica and alkali earth metal oxide, drying the precipitate to form said catalyst, and maintaining said oil in contact with said catalyst within said cracking zone for a period sufficient to obtain a substantial cracking thereof.

5. The method defined in claim 4 wherein the alkali earth metal oxide is magnesium oxide.

6. The method defined in claim 4 wherein the alkali earth metal oxide is calcium oxide.

7. A method of cracking hydrocarbon oils which comprises passing the oil to be cracked through a cracking zone maintained at active cracking temperature, contacting said oil during passage through said cracking zone with a catalyst prepared by mixing an alkyl silicate with an aqueous solution of a halide of aluminum and an alkaline earth metal oxide, adding ethylene oxide to said solution to form a mixed gel of alumina, silica and alkaline earth metal oxide, drying the resulting mixture to form said catalyst, and maintaining said oil in contact with said catalyst for a period sufficient to obtain the desired cracking thereof.

8. A method of cracking hydrocarbon oils which comprises passing the oil to be cracked through a cracking zone maintained at active cracking temperature, contacting said oil within said zone with an active cracking catalyst substantially free of alkali and comprising alumina, silica and from 1% to 10% by weight of an alkaline earth metal oxide, said catalyst being formed by combining alumina and said alkaline earth metal oxide with silica precipitated from an alkyl silicate solution, and maintaining said oil in contact with said catalyst for a period sufficient to obtain a substantial cracking thereof.

EDWARD D. REEVES.
KENNETH K. KEARBY.